US006855753B1

(12) United States Patent
Englert

(10) Patent No.: US 6,855,753 B1
(45) Date of Patent: Feb. 15, 2005

(54) ACOUSTICAL TILE CONTAINING WET-STRENGTH RESIN

(75) Inventor: Mark H. Englert, Libertyville, IL (US)

(73) Assignee: USG Interiors, Inc., Chicago, IL (US)

( * ) Notice: Subject to any disclaimer, the term of this patent is extended or adjusted under 35 U.S.C. 154(b) by 0 days.

(21) Appl. No.: 09/718,755

(22) Filed: Nov. 22, 2000

(51) Int. Cl.$^7$ ............................... C08L 3/02; C08L 5/16
(52) U.S. Cl. ............................ 524/47; 524/13; 524/14; 524/35; 524/37; 524/502; 524/443
(58) Field of Search ........................... 524/13, 14, 35, 524/37, 42–46, 502, 443

(56) References Cited

U.S. PATENT DOCUMENTS

| | | | |
|---|---|---|---|
| 4,126,599 A | | 11/1978 | Sugahara et al. |
| 4,549,931 A | * | 10/1985 | Adamowicz et al. ....... 162/145 |
| 4,587,279 A | | 5/1986 | Salyer et al. |
| 5,026,576 A | | 6/1991 | Benvenuto et al. |
| 5,075,358 A | | 12/1991 | Riley et al. |
| 5,174,818 A | | 12/1992 | Symons |
| 5,185,389 A | | 2/1993 | Victor |
| 5,250,153 A | | 10/1993 | Izzard et al. |
| 5,395,442 A | | 3/1995 | Dunston et al. |
| 5,395,571 A | * | 3/1995 | Symons ....................... 264/42 |
| 5,558,710 A | | 9/1996 | Baig |
| 5,603,758 A | | 2/1997 | Schreifels et al. |
| 5,725,656 A | | 3/1998 | Shimanovich et al. |
| 5,753,871 A | | 5/1998 | Kahara et al. |
| 5,814,146 A | | 9/1998 | Di Maggio et al. |
| 5,879,825 A | | 3/1999 | Burke et al. |
| 5,911,818 A | | 6/1999 | Baig |
| 5,928,588 A | * | 7/1999 | Chen et al. .................. 264/113 |
| 5,964,934 A | | 10/1999 | Englert |
| 6,586,520 B1 | * | 7/2003 | Canorro et al. ............. 524/514 |

FOREIGN PATENT DOCUMENTS

EP        1 180 559 A1     2/2002

OTHER PUBLICATIONS

Ampulski, R. S. and C. W. Neal, "The Effect Of Inorganic Ions On The Adsorption and Ion Exchange Of Kymene 557H By Bleached Northern Softwood Kraft Pulp", Tappi Journal, May 1988, pp. 133–137.
Au, C. O. and I. Thorn, Applications of Wet–End Paper Chemistry, Blackie Academic & professional, London 1995.
Bates, N. A., "Polyamide–Epichlorohydrin Wet–Strength Resin", Tappi Journal, Jun. 1969, vol. 52, No. 6, pp. 1157–1161.
Bates, N. A., "Polyamide–Epichlorohydrin Wet–Strength Resin", Tappi Journal, Jun. 1969, vol. 52, No. 6, pp. 1162–1168.
Carr, M. E., Doane, W. M., Hamerstrand, G. E., and B. T. Hofreiter, "Interpolymer from Starch Xanthate and Polyamide–Polyamine–Epichlorohydrin Resin: Structure and Papermaking Application", Presented at the 5$^{th}$ Great Lakes Regional American Chemical Society Meeting, Peoria, Illinois, Jun. 10–11, 1971.

Coleman, A., "Non Formaldehyde Wet Strength Agents—Panel Discussion", 1983 Papermakers Conference, Tappi, pp. 31–34.
Devore, D. I. and S. A. Fischer, "Wet–Strength Mechansim of Polyaminoamide–Epichlorohydrin Resins", Tappi Journal, Aug. 1993, vol. 76, No. 8, pp. 121–127.
Espy, H. H., "Alkaline–curing Polymeric Amine–Epichlorohydrin Wet–Strength Resins", paper Distributed by Henkel Corporation, 86 pages.
Espy, H. H., "Poly(aminoamide)–epichlorohydrin Resin—Carboxymethylcellulose Combinations for Wet and Dry Strength in Paper", 1983 Papermakers Conference, Tappi, pp. 191–195.
Espy, H. H., and T. W. Rave, "The Mechanism of Wet–Strength Development By Alkaline–Curing Amino Polymer–Epichlorohydrin Resins", Tappi Journal, May 1988, pp. 133–137.
Farewell, John, Commercially Available Chemical Agents For Paper And Paperboard Manufacture, Tappi Press, Atlanta 1990.
Fischer, S. A. "Structure and Wet Strength Activity of Polyaminoamide–Epichlorohydrin Resins having Azetidinium Functionality", Henkel Corp. Distributed Paper, pp. 1–20.
Hercules Product Data Sheet, "Kymene 557H", No. 7081–1.
Hercules Technical Data Sheet, "Kymene 557H For Wet–Strength Paper", Bulletin PM–507A.
Merrett, K. J., "Factors Affecting The Performance Of Polyamide Type Wet Strength Resins", Appita, vol. 37, No. 3, Nov. 1983, pp. 233–236.
Pahl, B. L., and H. H. Espy, "Advanced Topics in Papermaking With Alkali–Curing Polyamide Wet–Strength Resins", 1987 Advanced Topics in Wet End Chemistry—Seminar, pp. 77–82.
Scott, W. E., Principles of Wet End Chemistry, Tappi Press, Atlanta 1996.
Smoog, G. A., Handbook for Pulp & Paper Technologists, Second Edition, Angus Wilde Publications, Vancouver 1992.
Spence, G., Wet & Dry Strength Additives Short Course, Course Notes from course given in Atlanta, GA, Aug. 10–12, 1998.
Turbak, A. F., "The Structure of Kymene", Tappi Proceedings, pp. 299–303.
Young, R. A., "Bonding of Oxidized Cellulosic Fibers and Interaction with Wet Strength Agents", Wood and Fiber, 10(2), 1978, pp. 112–119.

* cited by examiner

Primary Examiner—James J. Seidleck
Assistant Examiner—U. K. Rajguru
(74) Attorney, Agent, or Firm—Donald E. Egan; Michael M. Geoffrey; David F. Janci

(57) ABSTRACT

Disclosed is an acoustical tile composition in which the conventional starch binder is replaced by a wet-strength resin, such as a polyamine epichlorohydrin resin, can be fabricated into ceiling tiles and panels using conventional water felting processes and equipment with improved efficiency. The acoustical tile compositions, with the polyamine epichlorohydrin resins binder, can be dried significantly faster than comparable compositions containing conventional starch binders.

6 Claims, No Drawings

ACOUSTICAL TILE CONTAINING WET-STRENGTH RESIN

FIELD OF THE INVENTION

This invention relates to compositions containing a wet-strength resin, which are useful in manufacturing acoustical tiles and panels for ceiling and other applications using a water felting process. More particularly, this invention relates to acoustical tile compositions in which the conventional starch binder is replaced by a wet-strength resin, such as polyamine epichlorohydrin resin, to provide compositions that can be fabricated into tiles and panels using conventional water felting processes and equipment with improved efficiency. Still more particularly, this invention relates to acoustical tile compositions, which include polyamine epichlorohydrin resins, which can be efficiently fabricated into ceiling tiles and panels, which can be dried significantly faster than comparable compositions containing conventional starch binders.

BACKGROUND OF THE INVENTION

The water felting of dilute aqueous dispersions of mineral wool and/or lightweight aggregate is a well-known commercial process for manufacturing acoustical ceiling tile. In this process, an aqueous slurry of mineral wool, lightweight aggregate, cellulosic fiber, starch binder and other ingredients, as desired or necessary, is flowed onto a moving foraminous support wire, such as that of a Fourdrinier or Oliver mat forming machine, for dewatering. The slurry may be first dewatered by gravity and then dewatered by vacuum suction means to form a basemat. The wet basemat is then pressed (with or without the application of additional vacuum) to the desired thickness between rolls and the support wire to remove additional water. The pressed basemat is then dried in heated drying ovens, and the dried material is cut to the desired dimensions and optionally sanded and/or top coated, such as with paint, to produce acoustical ceiling tiles and panels.

Mineral wool acoustical tiles are very porous which is necessary to provide good sound absorption. The prior art (e.g. U.S. Pat. Nos. 3,498,404; 5,013,405; 5,047,120 and 5,558,710) also discloses that mineral fillers may be incorporated into the composition to improve sound absorbing properties and to provide lightweight acoustical tiles and panels.

Acoustical tile compositions must contain a binder and usually employ starch as the binder. The prior art (e.g. U.S. Pat. Nos. 5,911,818 and 5,964,934) suggest that as much as 15% by weight of the composition may be starch although about 6 or 7% by weight is conventionally used.

The prior art (e.g. U.S. Pat. No. 5,250,153) also describes the use of latex binders for acoustical tile compositions and a wide variety of vinyl latex binders have been suggested for this purpose.

It is an object of this invention to provide an acoustical tile composition wherein a wet-strength resin such as a polyamine epichlorohydrin resin replaces the conventional starch binder and the resulting composition may be more efficiently fabricated into acoustical tiles and panels in a water felting process.

It is a further object of this invention to provide an acoustical tile composition wherein the conventional starch binder is replaced by a polyamine epichlorohydrin resin to provide compositions that may be more efficiently fabricated into acoustical tiles and panels having improved performance in high humidity conditions. These and other objects will be apparent to persons skilled in the art in view of the description that follows.

SUMMARY OF THE INVENTION

The present invention relates to compositions containing a wet-strength resin, which compositions are useful in manufacturing acoustical tiles and panels for ceiling and other applications using a water felting process. More particularly, this invention relates to acoustical tile compositions in which the conventional starch binder is replaced by a wet-strength resin, such as a polyamine epichlorohydrin resin, to provide compositions that can be fabricated into tiles and panels using conventional water felting processes and equipment with improved efficiency. Still more particularly, this invention relates to acoustical tile compositions, which include polyamine epichlorohydrin resins, which can be efficiently fabricated into ceiling tiles and panels that can be dried significantly faster than comparable compositions containing conventional starch binders.

The present invention is based on the discovery that a ceiling tile fabricated from an acoustical tile composition containing the conventional level of a starch binder, typically about 7% by weight of starch, requires a significant amount of heat to dry. It has been found that when a wet-strength resin such as a polyamine epichlorohydrin resin replaces the conventional starch binder in the acoustical tile composition the resulting tile requires significantly less heat to dry. Further it has been found that substituting a polyamine epichlorohydrin resin in the acoustical tile composition (for all or part of) the conventional starch binder produces ceiling tile having improved properties, such as improved high humidity sag-resistance. The acoustical tile compositions of the present invention also contain lightweight aggregate, cellulosic fiber, in addition to the polyamine epichlorohydrin resin binder. The composition of the present invention may also contain conventional materials such as mineral fiber and fillers such as clay, gypsum and limestone.

The acoustical tile compositions of this invention must include a lightweight aggregate such as expanded perlite. The acoustical tile compositions of the present invention must also contain cellulosic fiber that may comprise waste newsprint and/or waste (scrap) acoustical tiles and panels, which are environmentally friendly. The acoustical tile compositions may also contain a reduced amount of mineral wool or may contain no mineral wool. The dried product can be formed into tiles or panels having acoustical properties comparable to those of commercially available acoustical tiles. The acoustical tiles made from the compositions of this invention have acceptable physical properties for use in suspended ceiling systems.

DETAILED DESCRIPTION OF THE INVENTION

The present invention relates to an acoustical tile composition wherein the conventional starch binder is replaced by a wet-strength resin such as a polyamine epichlorohydrin resin to provide a composition that can be used in a water felting process to make ceiling tile. The water felting process to which the present invention pertains comprehends the formation of an aqueous dispersion comprising lightweight aggregate, cellulose fiber and a polyamine epichlorohydrin resin binder with sufficient water to make the dispersion to be flowable. The aqueous dispersion is flowed onto a moving foraminous support wire where it forms a cake, which is dewatered through a combination of gravity and vacuum dewatering. The dewatered cake is then pressed (with or without the application of additional vacuum) to a given thickness to form a basemat. The pressing step (with or without the application of additional vacuum) further dewaters the basemat. The basemat is then passed into a drying kiln in which the moisture in the basemat is reduced to less than 5% and preferably less than 1% in the final product.

The acoustical tile compositions of this invention must include a, lightweight aggregate such as expanded perlite and cellulosic fiber and a polyamine epichlorohydrin resin binder. In the preferred embodiment, the composition of the present invention may additionally include mineral fiber and clay filler. The present invention is not limited to any precise amounts of materials. In general, the present invention contemplates compositions containing the following components in the amounts shown in Table 1.

TABLE 1

| Ingredient | Useable Range | Preferred Range | Preferred Percentage |
| --- | --- | --- | --- |
| Perlite | Up to 75% | 15 to 70% | 50% |
| Cellulosic Fiber | Up to 25% | 3 to 20% | 18% |
| Filler | 0 to 25% | 0 to 20% | 20% |
| Mineral Fiber | 0 to 85% | 5 to 65% | 5% |
| Starch | 0 to 15% | 0 to 8% | 0% |
| polyamine epichlorohydrin resin binder | 0 to 7.5% | 1 to 4% | 2.5% |
| Total | | | 100% |

Replacement of the starch with polyamine epichlorohydrin resin in a conventional acoustical ceiling tile composition enables the product to be dried faster and allows the entire water felting line to be run at higher speed.

The Wet Strength Resin

The wet strength resin used in the present invention is selected from a class of products based on the reaction of an amino polyamide and epichlorohydrin. This reaction results in the formation of azetidinium groups, which are responsible for the cationic character and reactivity of the wet strength resin. These compounds are used universally in the paper industry to provide wet strength to paper. Although a variety of wet-strength resins may be used in the compositions of the present invention, the resin selected must meet four requirements to be effective, namely, it must be 1) water soluble, 2) cationic, 3) polymeric and 4) reactive. The requirement for water solubility allows the resin to be readily dispersed in an aqueous system. A cationic charge on the resin is necessary for retention of the resin in the water felting process. The polymeric nature of the resin is necessary so that the resin can bridge fibers and form a polymeric network within the forming mat. A suitable resin must be reactive so that is can form bonds with the carboxyl groups on the cellulose and with itself.

The preferred wet strength resin must meet four requirements in order to be effective as a wet strength resin. First, the polymeric backbone of the wet strength resin must be made cationic typically by the presence of positively charged azetidinium groups. These groups provide both water solubility as well as a cationic charge to the backbone. The resin must also be capable of cross-linking. This type of resin actually imparts wet strength by 1) crosslinking with the cellulose by the formation of resin-cellulose bonds and/or 2) providing a protection of fiber—fiber contacts by a network of cross-linked resin molecules that do not necessarily react with cellulose. Crosslinking is accomplished by the reaction of the azetidinium groups with residual secondary amine groups on the resin backbone and with carboxyl groups on the cellulosic fibers and fines. This resin is effective over pH range of 5.0–09.0 but is most effective at pH 6.5–8.5.

The preferred wet strength resin is a polyamine epichlorohydrin resin sold by Hercules, Inc under the name Kymene 557. Kymene 557H is a high-efficiency, cationic wet-strength resin used commonly in papermaking to impart wet strength. Other commercially available wet strength resins include Cal-Zet 40, an amino-polyamide-epichlorohydrin wet strength additive produced by the Callaway Chemical Company. Products with similar chemistry are offered by Cytec (Parez® brand WSA resins), Henkel (Fibrabon® brand WSA resins), Georgia-Pacific (Amres® brand WSA resins) and others.

Retention Aid

In order to retain the wet strength resin in the basemat during the water felting process, it is necessary to add a small amount of a retention aid to the furnish to help retain the wet strength resin. The retention aids used in the present invention can be any of a number of polymers that promote aggregation by bridging between particles and/or molecules. These retention aids possess some residual negative charge, which acts to form an agglomerate with the cationic wet strength resin. It is this agglomerate of resin and retention aid that is then retained within the forming basemat as water is removed during the forming process.

It has been found that retention of the wet strength resin is improved by the addition of Hercules Aqualon D-3378, a guar-based product with both cationic and anionic functionality, or Hercules CMC-7MT, a technical grade of sodium carboxymethylcellulose (CMC), or Nalco N 8677 Plus, a low molecular weight anionic polyacrylic water-soluble resin. Other retention aids which function to "tie up" the soluble cationic wet strength resin may be used in the composition of the present invention.

Other Components

One major component in the novel acoustical tile composition of this Invention is lightweight aggregate. It is well known in the art to use expanded perlite in acoustical tile compositions. Expanded perlite and other lightweight aggregate materials have been used in acoustical tile because of their low cost and low density (e.g. 3 to 8 pounds per cubic foot). The lightweight aggregate provides bulking, and porosity in the composition that enhances acoustical properties. It has been found that a low density (i.e., 3–8 pcf) expanded perlite provides sufficient bulking and porosity.

A second major component in the novel acoustical tile compositions of this invention is the cellulosic fiber, which serves as a bulking agent. The cellulose fiber may also function as a binder and may help to retain fines. Several types of cellulosic fiber have been evaluated in these compositions. It is well known to use newsprint in acoustical tile formulations, and both hammer-milled and hydro-pulped newsprint have been evaluated in these compositions. Refined paper fibers and wood fiber may also be used as the source of the cellulosic fiber, however, it has been found that ceiling tiles made with wood fiber, either softwood or hardwood, are more difficult to cut with a knife at the installation site. Furthermore, wood fibers are a more expensive source of the cellulosic fiber.

The third essential component is the binder component, which is an essential component. The binder must be a wet strength resin such as a polyamine epichlorohydrin resin. The use of a wet strength resin as a complete replacement for the starch is preferred as this provides the maximum reduction in drying time although lesser degrees of substitution are possible.

A fourth preferred component, which also is not novel in acoustical compositions, is clay. It is deemed essential to use at least 4% and preferably at least 10% by weight of clay in the ceiling tile formulation in order to impart fire resistance (as defined by ASTM Test No E119) because the clay sinters during the fire endurance test. Clays that may be used include CTS-1 from KT Clay of Sledge, Miss., CTS-2 from KT Clay of Sledge, Miss., Spinks Clay from Gleason, Tenn. and Old Hickory Clay from Hickory, Ky. Other commercial clays such as Kaolin and Bentonite etc. can be used in the ceiling tile formulation.

In addition, the acoustical compositions of this invention may also contain mineral wool of the type conventionally used in acoustical tiles, inorganic fillers such as mica, wollastonite, silica, gypsum, stucco and calcium carbonate, other lightweight aggregates, surfactants and flocculants. These ingredients are well known to those skilled in the art of the preparation of acoustical tile compositions. As noted above, the composition may contain some mineral wool (in reduced amount), however, it has been found that the compositions of this invention can be used to make mineral wool-free acoustical tiles and panels.

EXAMPLES

The following examples will serve to illustrate the preparation of several acoustical tile compositions within the scope of the present invention. It is understood that these examples are set forth for illustrative purposes and that many other compositions are within the scope of the present invention. Those skilled in the art will recognize that similar acoustical tile compositions may be prepared containing other quantities of materials and equivalent species of materials than those illustrated below.

Example 1

Three lab boards were prepared using the materials shown in Table 2, below. Test Boards 1 and 2 contained a wet strength resin, Kymene 557H from Hercules in the amounts shown in Table 2. Aqualon D-3378, a guar-based product with both cationic and anionic functionality produced by Hercules, was added as a retention aid at a level of 40% by weight, based on the weight of Kymene 557H solids. Table 2 presents the materials in percentages on a dry basis.

TABLE 2

| Material | Control Board | Test Board 1 | Test Board 2 |
|---|---|---|---|
| Mineral wool | 25.00 | 25.77 | 25.25 |
| Perlite | 50.00 | 51.55 | 50.51 |
| Recycled Newspaper | 18.00 | 18.56 | 18.18 |
| Starch | 7.00 | 0.00 | 0.00 |
| Kymene 557H | 0.00 | 4.12 | 6.06 |
| Cytec 184 Polyacrylamide Flocculant | 0.08 | 0.00 | 0.00 |
| Aqualon D-3378 Guar based flocculant | 0.00 | 1.65 | 2.42 |
| Total | 100.08 | 101.65 | 102.42 |

All samples were dried with steam for 30 minutes with the temperature ramping up to 600° F. to insure full cooking of the starch. This was followed by 3 hours of 300° F. drying without steam. Physical tests were run on the boards described in table 2. The test results are shown in Table 2A, below:

TABLE 2A

| Test | Control Board | Test Board 1 | Test Board 2 |
|---|---|---|---|
| Density (pcf) | 11.67 | 10.99 | 10.93 |
| MOR (psi) | 95 | 100 | 99 |
| Corrected MOR* (psi) | 100 | 119 | 120 |
| Hardness (lbs.) | 124 | 118 | 123 |
| Loss on Ignition | 22.34% | 18.47% | 19.51% |
| Binder retained | 89.38% | 83.94% | 81.29% |

*Corrected MOR values utilize a standard density of 12 pcf.

Example 2

Six lab boards were prepared using the materials shown in Table 3, below. Test Boards 3–7 contained 6% by weight of wet strength resin, Kymene 557H from Hercules, and from 10% to 40% by weight of Aqualon D-3378, a guar-based product with both cationic and anionic functionality produced by Hercules. Table 3 presents the materials in percentages on a dry basis.

TABLE 3

| Material | Control Board | Test Board 3 | Test Board 4 | Test Board 5 | Test Board 6 | Test Board 7 |
|---|---|---|---|---|---|---|
| Mineral wool | 25.00 | 25.10 | 24.95 | 24.80 | 24.65 | 24.51 |
| Perlite | 50.00 | 50.20 | 49.90 | 49.60 | 49.31 | 49.02 |
| Newspaper scrap | 18.00 | 18.07 | 17.96 | 17.86 | 17.75 | 17.65 |
| Starch | 7.00 | 0.00 | 0.00 | 0.00 | 0.00 | 0.00 |
| Kymene 557H | 0.00 | 6.02 | 5.99 | 5.95 | 5.92 | 5.88 |
| Cytec 184 | 0.08 | 0.00 | 0.00 | 0.00 | 0.00 | 0.00 |
| Aqualon D-3378 | 0.00 | 0.60 | 1.20 | 1.79 | 2.37 | 2.94 |
| Total | 100.08 | 100.00 | 100.00 | 100.00 | 100.00 | 100.00 |

All samples were dried with steam for 30 minutes with the temperature ramping up to 600° F. to insure full cooking of the starch. This was followed by 3 hours of 300° F. drying without steam. Physical tests were run on the boards described in table 3. The results are shown below in Table 3A.

TABLE 3A

| Test | Control Board | Test Board 3 | Test Board 4 | Test Board 5 | Test Board 6 | Test Board 7 |
|---|---|---|---|---|---|---|
| Density (pcf) | 11.57 | 10.94 | 10.97 | 10.27 | 10.79 | 11.17 |
| MOR (psi) | 92 | 50 | 65 | 76 | 89 | 132 |
| Corrected MOR* (psi) | 99 | 60 | 78 | 104 | 110 | 153 |
| Hardness (lbs.) | 91 | 74 | 87 | 92 | 109 | 108 |
| Loss on Ignition (%) | 20.67 | 17.35 | 17.23 | 19.59 | 18.74 | 19.01 |
| Binder retained (%) | 82.68 | 72.30 | 71.79 | 81.64 | 78.09 | 79.19 |

*Corrected MOR values utilize a standard density of 12 pcf.

Example 3

Six lab boards were prepared using the materials shown in Table 4, below. Test Boards 8–12 contained various amounts of weight of wet strength resin, Kymene 557H from Hercules. Aqualon CMC-7MT, a carboxymethylcellulose (CMC) produced by Hercules, was added as a retention aid at a level of 40% by weight, based on the weight of Kymene 557H solids. Table 4 presents the materials in percentages on a dry basis.

TABLE 4

| Material | Control Board | Test Board 8 | Test Board 9 | Test Board 10 | Test Board 11 | Test Board 12 |
|---|---|---|---|---|---|---|
| Mineral wool | 25.00 | 26.48 | 26.10 | 25.72 | 25.35 | 25.35 |
| Perlite | 50.00 | 52.97 | 52.19 | 51.44 | 51.71 | 50.71 |
| Newspaper scrap | 18.00 | 19.07 | 18.79 | 18.52 | 18.26 | 18.28 |
| Starch | 7.00 | 0.00 | 0.00 | 0.00 | 0.00 | 0.00 |
| Kymene 557H | 0.00 | 1.06 | 2.00 | 3.09 | 4.06 | 5.07 |
| Cytec 184 | 0.08 | 0.00 | 0.00 | 0.00 | 0.00 | 0.00 |
| Aqualon CMC-7MT | 0.00 | 0.42 | 0.84 | 1.23 | 1.62 | 1.67 |
| Total | 100.08 | 100.00 | 100.00 | 100.0 | 100.0 | 100.0 |

All samples were dried with steam for 30 minutes with the temperature ramping up to 600° F. to insure full cooking of the starch. This was followed by 3 hours of 300° F. drying without steam. Physical tests were run on the boards described in table 5. The results are shown below in Table 4A.

TABLE 4A

| Test | Control Board | Test Board 8 | Test Board 9 | Test Board 10 | Test Board 11 | Test Board 12 |
|---|---|---|---|---|---|---|
| Density | 11.40 | 10.84 | 10.06 | 10.76 | 11.14 | 10.96 |
| MOR | 87 | 61 | 48 | 94 | 104 | 95 |
| Corrected MOR* | 96 | 75 | 68 | 117 | 121 | 114 |
| Hardness | 117 | 90 | 71 | 105 | 101 | 108 |

*Corrected MOR values utilize a standard density of 12 pcf.

Examples 1 to 3 illustrate that it is possible to replace the 7% starch in a conventional acoustical tile composition with 2.5% of a wet strength resin and achieve equivalent or even slightly improved physical properties. These results were achieved while retaining only about 60% of the wet strength resin in the test boards. With improved retention of the wet strength resin, it should be possible to achieve physical properties equivalent to 7% starch using only 1.4% wet strength resin.

Preparation of Lab Boards

1. Combine water, mineral wool, starch, perlite, and newsprint
2. Mix at highest mixer setting for 3.0 minutes.
3. Add polyamine epichlorohydrin resin (if required) and mix sufficiently to achieve a homogeneous mix.
4. Add flocculant; mix for 5 seconds.
5. Set up TAPPI box with a piece of nonwoven scrim on top of the wire.
6. Prefill TAPPI box with water to just cover the nonwoven scrim.
7. Pour stock into TAPPI box.
8. Apply gravity drainage.
9. Apply 5 seconds of 20"Hg vacuum.
10. Weight formed mat. Arrange mat between pieces of plastic wire and perforated plate.
11. Transfer to hydraulic press. Press mat to desired thickness. Weigh.
12. Dry to constant weight.

Example 4

Two identical pilot line runs were conducted using the formulations shown in Table 5, below. The first run was made using a standard formula using a starch binder. The second run was made using a formulation that contained 2.5% by weight of a wet strength resin, Kymene 557H from Hercules. Table 5 presents the materials in percentages on a dry basis.

TABLE 5

| Material | Run #1 | Run #2 |
|---|---|---|
| Perlite | 50.00 | 50.00 |
| Mineral wool | 25.00 | 25.00 |
| Starch | 7.00 | 0.00 |
| Newspaper scrap | 18.00 | 18.00 |
| Kymene 557H | 0.00 | 2.50 |
| Aqualon CMC-7MT | 0.00 | 1.00 |
| Nalco 7520 Polyacrylamide Flocculant | 0.08 | 0.00 |
| Total | 100.08 | 96.50 |

All samples were dried with steam for 30 minutes with the temperature ramping up to 600 F to insure full cooking of the starch. This was followed by 3 hours of 300 F. drying without steam. Physical tests were run on the boards described in table 5A. The average test results are shown in Table 5A, below:

TABLE 5A

| Test | Run #1 | Run #2 |
|---|---|---|
| Sag @ 90°/90% RM | 0.097 | 0.084 |
| Sag @ 75°/10% RM | 0.092 | 0.078 |
| Sag @ 70°/50% RM | 0.096 | 0.082 |
| Loss on Ignition | 18.25 | 16.07 |

The other physical properties of the products were comparable.

Example 5

Lab boards were prepared containing six varying amounts and types of binder to compare the effects that starch level and wet strength resin level have on the drying properties of the water-felted acoustical ceiling product. Lab boards were prepared using five different amounts of a starch binder as described below in Table 6, in order to demonstrate the effect that the amount of starch had on the drying rate. The drying rates for the boards with the starch binder were compared to boards prepared using 2.5% of a wet strength additive, Kymene 557H from Hercules.

TABLE 6

| Board Number | Binder |
|---|---|
| 1 | 7% Starch |
| 2 | 5% Starch |
| 3 | 3% Starch |
| 4 | 1% Starch |
| 5 | No Starch |
| 6 | 2.5% Kymene 557H; No Starch |

The composition of Board #1, containing 7% starch is shown below in Table 7.

TABLE 7

| Component | Dry Weight - grams | Dry Percent |
|---|---|---|
| Mineral Wool | 11.70 | 9.00 |
| Perlite | 74.10 | 57.00 |
| Newsprint | 24.70 | 19.00 |
| Starch-Pearl | 9.10 | 7.00 |
| Sodium Bicarbonate | 10.40 | 8.00 |
| Total | 130.00 | 100.00 |

The components were mixed with 3300 grams of water for 5 minutes to give a stock consistency of 4.0%. This gave a Theoretical Oven Dry Weight of 130.0 grams. Although the percentage of binder was varied in boards 1 through 6, the weights for all of the other components were kept constant.

In the commercial water-felting process for manufacturing ceiling tile using a starch binder, the starch must be fully cooked to effectively function as a binder. In order to replicate the temperature and humidity conditions under which ceiling tile is manufactured in a commercial water felting process, all of the test boards were pre-steamed at 300° F. for 30 minutes prior to drying. The pre-steaming step was accomplished by wrapped the wet board in a piece of aluminum foil and placing the wrapped board in a pre-heated 300° F. oven for 30 minutes. This procedure insures that the starch is fully cooked prior to initiating drying.

After each lab board was pre-steamed, it was placed on a support frame inside the tunnel oven capable of monitoring the weight of the board. The support frame rested on a balance located directly below the oven. The weight of the basemat was monitored during the entire drying process. Using this set-up, a drying profile was obtained for each trial board. The drying times reported were taken as the time required to remove 98% of the total water content (leaving a 2% moisture content). The results of the drying studies are presented below in Table 8.

TABLE 8

| BOARD # | Thickness (inches) | Density (pcf) | Moisture Content (%) | Drying Time (min) |
|---|---|---|---|---|
| 1A | 0.667 | 11.3 | 71.6 | 82.8 |
| 1A | 0.667 | 10.9 | 73.3 | 80.9 |
| 2 | 0.665 | 10.9 | 73.0 | 80.7 |
| 3 | 0.667 | 10.6 | 72.4 | 68.2 |
| 4 | 0.661 | 10.5 | 72.8 | 57.7 |
| 5A | 0.663 | 10.5 | 74.7 | 51.3 |
| 5B | 0.662 | 10.4 | 73.8 | 54.3 |
| 6A | NA | NA | NA | 52.0 |
| 6B | 0.659 | 10.7 | 71.3 | 51.7 |

The percent decrease in drying time is calculated, using the measured drying times of the boards, and using the drying time of Board #1 containing 7% starch as the base figure. The theoretical percent linespeed increase is calculated, using the average of the measured drying times of the boards, and using the average drying time of Board #1 containing 7% starch as the base figure. Both of these calculated values are shown below in Table 9.

TABLE 9

| Board # | Drying Time (Average min) | Decrease in Drying Time (%) | Increase in Linespeed (%) |
|---|---|---|---|
| 1 | 81.85 | | |
| 2 | 80.7 | 1.4% | 1.4% |
| 3 | 68.2 | 16.7% | 20.0% |
| 4 | 57.7 | 29.5% | 41.9% |
| 5 | 52.8 | 35.5% | 55.0% |
| 6 | 51.85 | 36.7% | 57.9% |

The results presented above confirm that replacing starch with wet strength resin has a dramatic effect on the drying rate of the acoustical ceiling tile. As shown below, a typical acoustical ceiling tile without starch will dry approximately 36% faster than a similar board prepared using 7% starch.

The drying studies conducted using 2.5% polyamine epichlorohydrin wet strength resin demonstrate that 2.5% of wet strength resin (1.4% retained polyamine epichlorohydrin resin) provides physical strength equal to the physical strength provided by 7% starch with a drying time is equivalent to a board made without starch. Thus a basemat made using 2.5% polyamine epichlorohydrin resin dries approximately 36% faster than a similar board prepared using 7% starch that has been cooked in the dryer. This again corresponds to a potential linespeed increase through the dryer of 56%.

The forms of invention shown above and described herein are to be considered only as illustrative. It will be apparent to those skilled in the art that numerous modifications may be made therein without departing from the spirit of the invention and the scope of the appended claims.

I claim:

1. A composition suitable for making acoustical tiles in a water-felting process, said composition comprising an amount up to 75% by weight of a lightweight aggregate, an amount up to 25% by weight of a cellulosic fiber, a binder and optionally up to 85% by weight of mineral wool, said binder consisting of a reactive water-soluble polyamine epichlorohydrin polymer having positively charged azetidinium groups and optionally up to 8% by weight of starch.

2. The composition described in claim 1 comprising up to 4.0% of polyamine epichlorohydrin resin based on the dry weight of the composition.

3. The composition described in claim 2 comprising about 2.5% of polyamine epichlorohydrin resin based on the dry weight of the composition.

4. The composition described in claim 1, comprising retention aid that promotes aggregation of said water soluble binder.

5. The composition described in claim 4, wherein said retention aid is a polymeric material that possesses a residual negative charge.

6. The composition described in claim 4, wherein said retention aid is selected from the group consisting of a guar-based product with both cationic and anionic functionality, sodium carboxymethyl cellulose, a water-soluble low molecular weight anionic polyacrylic resin and mixtures thereof.

* * * * *